(12) United States Patent
Fillipp et al.

(10) Patent No.: US 6,273,380 B1
(45) Date of Patent: Aug. 14, 2001

(54) BRICK GRIPPER

(75) Inventors: Stephen L. Fillipp; Chris O. McNeese, both of Lubbock, TX (US)

(73) Assignee: Gary Products Group, Inc., Lubbock, TX (US)

( * ) Notice: Subject to any disclaimer, the term of this patent is extended or adjusted under 35 U.S.C. 154(b) by 0 days.

(21) Appl. No.: 09/499,778

(22) Filed: Feb. 8, 2000

(51) Int. Cl.⁷ .................................................. A47F 5/08
(52) U.S. Cl. ........................ 248/231.91; 248/231.31; 248/304; 411/61; 411/60.1
(58) Field of Search .................. 248/231.91, 231.31, 248/303, 304, 498; 411/84, 61, 60.1, 60.2, 71, 53

(56) References Cited

U.S. PATENT DOCUMENTS

| | | |
|---|---|---|
| D. 321,314 | 11/1991 | Gary . |
| D. 361,950 | 9/1995 | Fillipp et al. . |
| D. 365,015 | 12/1995 | Avinger . |
| D. 373,948 | 9/1996 | Etzel et al. . |
| 1,560,095 * | 11/1925 | Peirce ................................. 411/60.1 |
| 1,851,292 * | 3/1932 | Rasmussen ......................... 411/60.1 |
| 2,471,584 * | 5/1949 | Richards ............................. 411/60.1 |
| 3,900,998 * | 8/1975 | Hubbard ............................. 411/60.1 |
| 6,182,933 * | 2/2001 | Rapp ............................. 248/231.31 X |

* cited by examiner

Primary Examiner—Ramon O. Ramirez
Assistant Examiner—Korie H. Chan
(74) Attorney, Agent, or Firm—Locke Liddell & Sapp LLP; Monty L. Ross

(57) ABSTRACT

A device useful for supporting decorative light strings or other articles from a brick wall, the device having an expander, retainer, hook and threaded fastener, the expander being insertable into a mortar groove, the retainer having teeth adapted to engage bricks surrounding the mortar groove when the retainer is tightened against the expander by the fastener, and a support hook attached to the retainer.

7 Claims, 3 Drawing Sheets

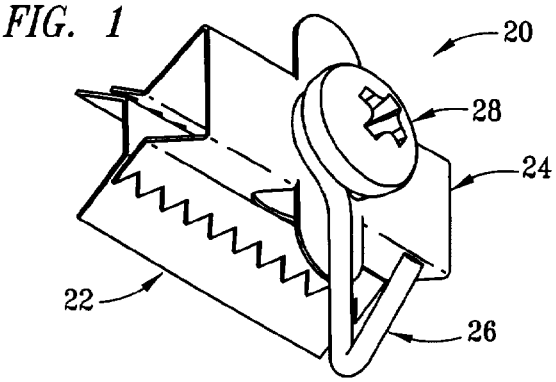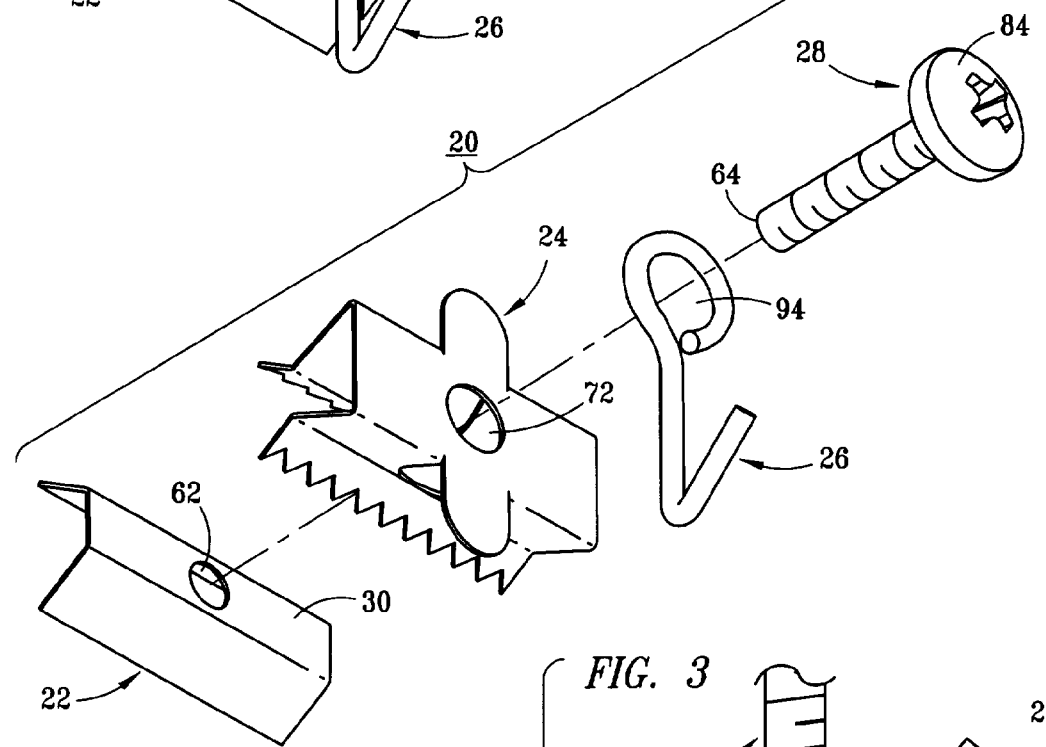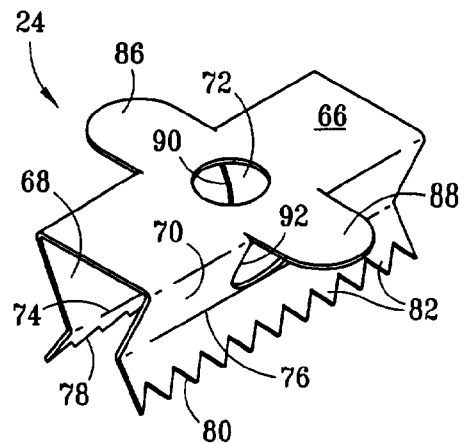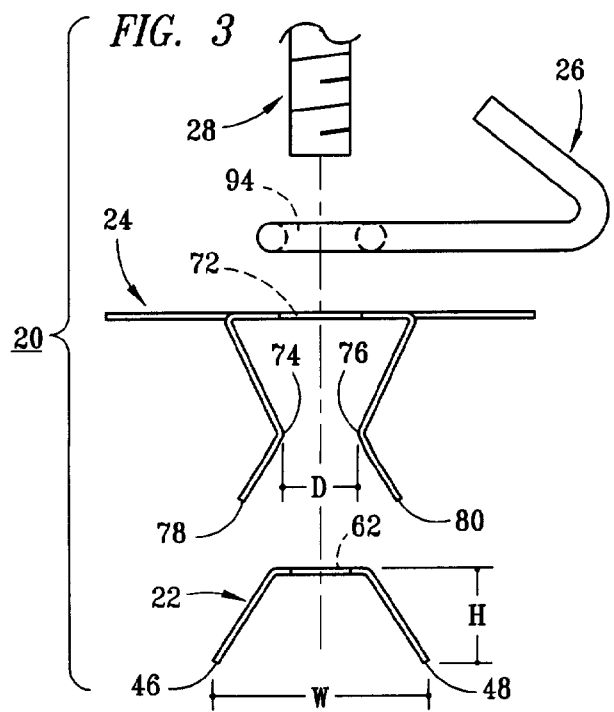

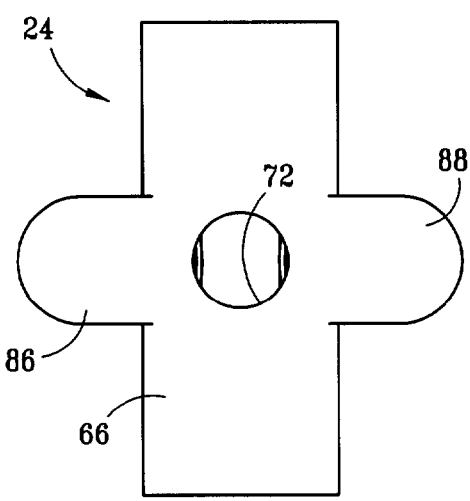
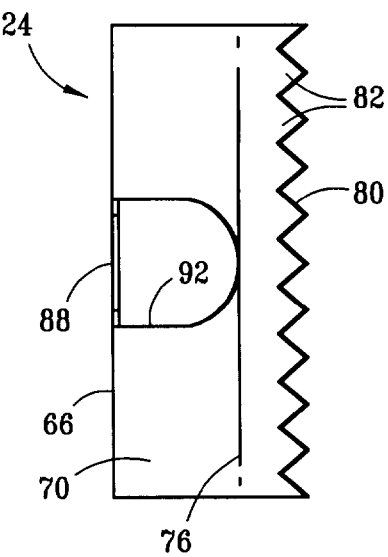
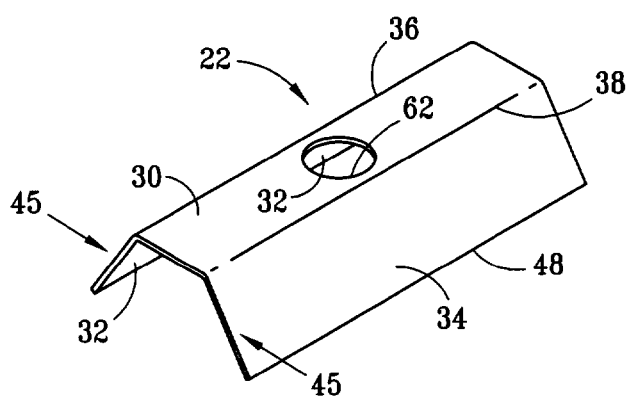
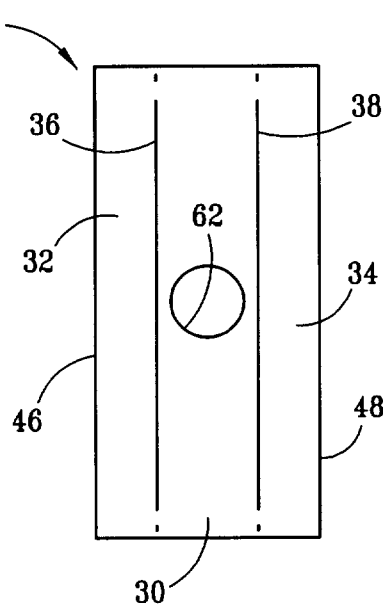
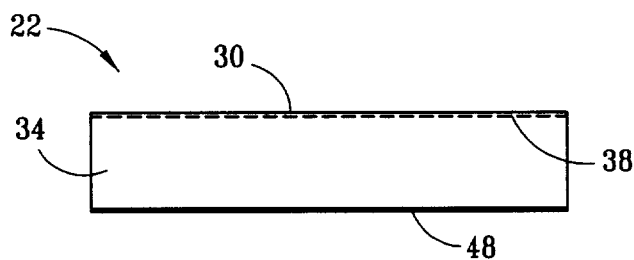
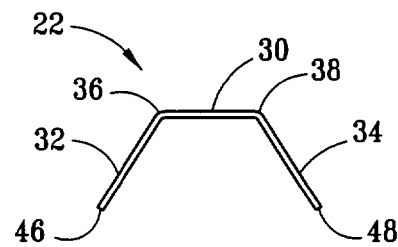

US 6,273,380 B1

BRICK GRIPPER

BACKGROUND OF THE INVENTION

1. Field of the Invention

This application relates to apparatus for installing decorations, particularly decorative light strings, on brick walls of a house or other building structure. The apparatus can be used either outdoors or indoors, as for example, in installing decorations on the brick wall of a fireplace.

2. Description of Related Art

There is a need for a device that can be used to install decorations, decorative light strings, electrical cords and the like along brick walls without the necessity of drilling holes into the masonry or mortar and without using adhesives that can leave a visible residue on the wall following removal. The commercially available devices known to applicant utilize masonry anchors or adhesives for attaching hooks or other support members to brick walls. The device should be usable on masonry walls having mortar grooves of various depths and should be capable of being quickly and easily installed and removed. The device should also comprise a hook member that is capable of either supporting an elongated strand such as a decorative light string, rope, garland, or the like, or hanging a decorative item such a wreath, stocking or picture from a brick wall. Such a device is disclosed herein.

SUMMARY OF THE INVENTION

According to one preferred embodiment, the invention is a support device preferably comprising an expander and a retainer each having alignable apertures, a bolt or screw insertable through the apertures and adapted to threadedly engage the expander, and a hook or clip member made integrally with or connectable to the retainer portion of the support member to support the decoration, light string, or the like.

According to one particularly preferred embodiment of the invention, a hook or clip is provided that has an eye at one end with an aperture such that the threaded portion, but not the head portion, of the screw or bolt can be inserted through the eye to attach the hook or clip to the retainer portion of the structural support member.

The apparatus of the invention can be made of either metal or a tough polymeric material, as desired. The preferred embodiment disclosed herein is made of metal. While this discussion is primarily focused on use with brick walls, it will be understood that the device of the invention can be similarly useful on walls made of concrete blocks, stone, or the like, where the mortar joints have grooves of sufficient depth to permit installation of the device.

BRIEF DESCRIPTION OF THE DRAWINGS

The apparatus of the invention is further described and explained in relation to the following drawings in which:

FIG. 1 is a perspective view of a preferred embodiment of the subject device as fully assembled;

FIG. 2 is an exploded perspective view of the device of FIG. 1;

FIG. 3 is a diagrammatic elevation view depicting the preferred vertical alignment among the threaded fastener, expander and retainer portions of the invention;

FIG. 4 is a perspective view of the retainer portion of the support member;

FIG. 5 is a plan view of the retainer;

FIG. 6 is a side view of the retainer as shown in FIG. 5;

FIG. 7 is a perspective view of the expander;

FIG. 8 is a plan view of the expander;

FIG. 9 is a side elevation view of the expander in the position as shown in FIG. 10;

FIG. 10 is a front elevation view of the expander as shown in FIG. 8;

DESCRIPTION OF THE PREFERRED EMBODIMENTS

Figure 11:
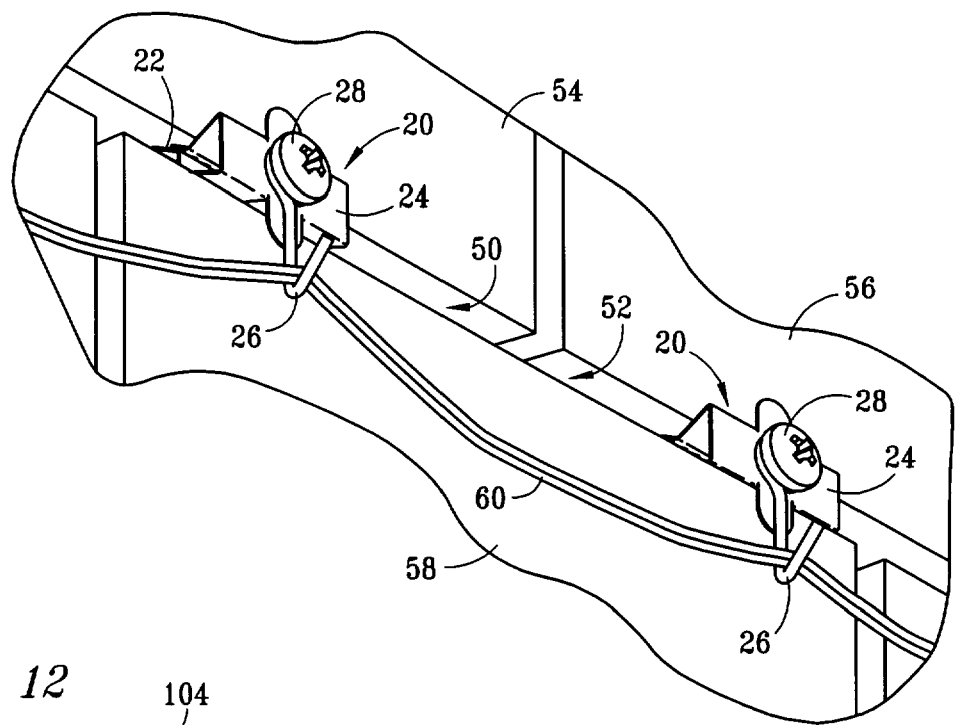
FIG. 11 is a perspective view showing two laterally spaced devices of the invention installed in a mortar groove of a brick wall.

Referring to FIGS. 1–2, support device 20 preferably comprises expander 22, retainer 24, hook 26, and threaded fastener 28. According to a preferred embodiment of the invention, the various parts of support device 20 are made of metal, although it will be appreciated that one or more of the parts can likewise be made of a durable polymeric material if desired. Referring to FIG. 11, support device 20 is adapted to be secured inside a groove such as is typically formed by the forwardly facing recesses 50, 52 in the mortar spaces between adjacent rows of bricks in a brick wall as illustrated, for example by bricks 54, 56 and 58. The brick wall can be an interior or exterior wall of a residence or other building, or part of another brick structure such as, for example, a fireplace, fence or mailbox. While use with brick walls is preferred, support device 20 is similarly useful for supporting an object or article from any surface having a space into which the device can be securely installed, as described below. Also, while the support devices 20 are shown in FIG. 11 as being installed in a horizontally oriented mortar space, which is generally preferred, it will be appreciated that the subject device can also be installed in a vertically oriented mortar space, or at some oblique angle, as in a mortar space between adjacent, irregularly shaped rocks or the like if desired.

As shown in FIG. 11, hooks 26 are being used to support an electrical cord 60 such as might be part of a decorative light string. It is understood, however, that hook 26 can also be used to support other objects such as, for example and without limitation, wreaths, pictures, mirrors, plaques, letters, candelabra, sconces, and the like. If desired for a particular purpose, a differently configured hook or another load-supporting structure can be similarly secured to and supported by support device 20 in place of hook 26. Thus, for example, a spring clip, resilient retainer clip or the like can be substituted for hook 26 in support device 20 of the invention. Also, while hook 26 is described in the preferred embodiment as a separate article held in place against retainer 24 by threaded fastener 28, it is understood that if retainer 24 is made, for example, from a moldable thermoplastic polymeric material, it is possible to unitarily mold a hook or similarly effective clip member as part of retainer 24. In that case, however, it is still necessary that threaded fastener 28 be provided for use in attaching retainer 24 to expander 22 as discussed below.

Referring to FIGS. 7–10, expander 22 preferably comprises an elongated front wall 30 and two inclined side walls 32, 34, with side walls 32, 34 being connected to front wall 30 along lines 36, 38, respectively. Expander 22 is preferably made by folding a flat metal sheet of desired size and thickness along lines 36, 38 to create the front and side walls. If made from a polymeric material, expander 22 can be molded into the desired shape. The thickness of the sheet and the material from which it is made are desirably such that it is possible to flex side walls 32, 34 slightly inward relative to each other by applying manual pressure against side walls 32, 34 as shown by arrows 45, thereby causing free edges 46, 48 to move closer together. When the pressure is released, expander 22 is preferably resilient enough that free edges 46, 48 will again move apart relative to each other, returning substantially to their original positions unless restrained by other structures as discussed below in relation to FIGS. 11–13. Referring to FIGS. 3 and 10, width W between free edges 46, 48 is desirably such that expander 22 is insertable into a mortar groove between adjacent bricks as described above in relation to FIG. 11. Height H is desirably such that clearance is provided for threaded fastener 28, and retainer 24 can be expanded into engagement with the bricks as described below in relation to FIGS. 12 and 13.

Referring to FIGS. 2, 7 and 8, aperture 62 is provided in front wall 30 to receive and threadedly engage threaded fastener 28 following insertion through hook 26 and retainer 24. Where expander 22 is made of sheet metal, as in the preferred embodiment, threaded fastener 28 can be a conventional sheet metal screw. Alternatively, a nut or retainer clip (not shown) can be provided and used to threadedly engage and secure threaded end 64 of fastener 28 following insertion through aperture 62.

Figure 12:
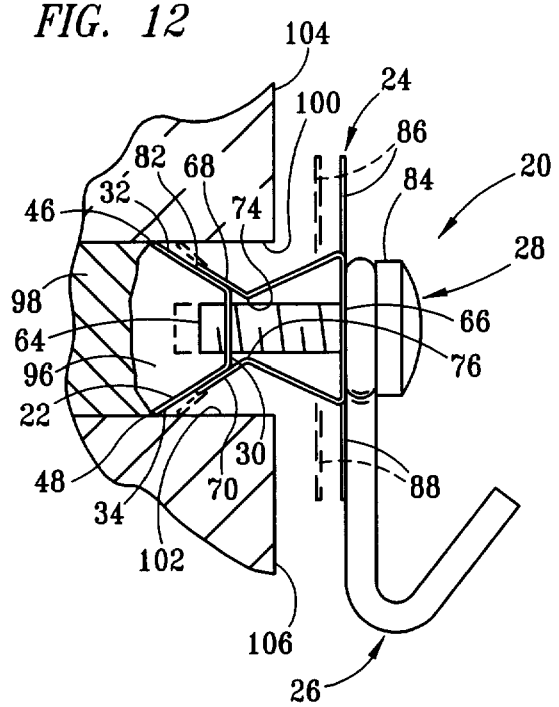
FIG. 12 is a side elevation view, in partial cross-section, showing a preferred support device of the invention installed in a relatively shallow mortar groove of a brick wall.
Figure 13:
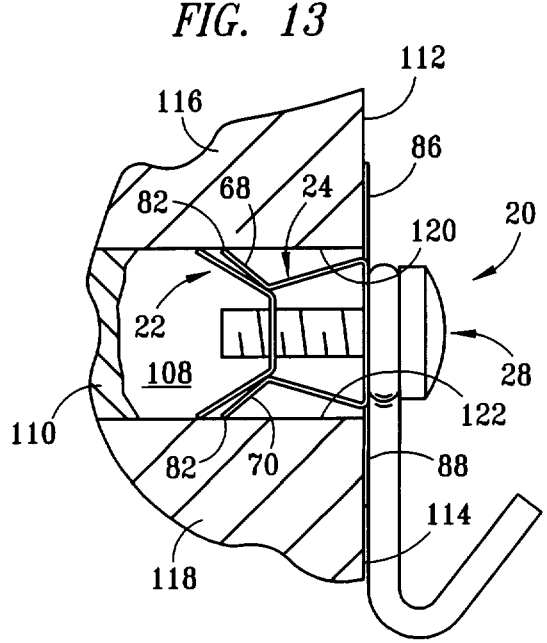
FIG. 13 is a side elevation view, in partial cross-section, showing a preferred support device of the invention installed in a deeper mortar groove of a brick wall.

Retainer 24 is further described and explained in relation to FIGS. 4–6. Retainer 24 is preferably made of a material such as those described above as being satisfactory for use in making expander 22, and preferably comprises front wall 66, side walls 68, 70 and aperture 72 that is alignable with aperture 62 whenever retainer 24 is disposed over expander 22 as depicted in FIG. 3. Side walls 68, 70 are desirably inclined inwardly above inflection lines 74, 76, and are inclined outwardly below the inflection lines. Distance D between inflection lines 74, 76 of retainer 24 is desirably less than the transverse distance across front wall 30 of expander 22 so that the portions of side walls 68, 70 along inflection lines 74, 76 are biased into contact with expander 22 whenever retainer 24 is lowered onto expander 22 during assembly as shown in FIG. 3. The portions of side walls 68, 70 below inflection lines 74, 76 are preferably inclined outwardly so that lower edges 78, 80 of side walls 68, 70 are expanded outwardly as retainer 24 is tightened against expander 22. Teeth 82 are preferably provided along lower edges 78, 80 to facilitate secure engagement with adjacent brick surfaces as shown in FIGS. 12 and 13. Wings 86, 88 preferably extend outwardly from front wall 66 of retainer 24 to prevent retainer 24 from being inserted too deeply into a deep mortar groove as explained below in relation to FIGS. 12 and 13. As shown in FIGS. 4–6, wings 86, 88 are desirably formed out of metal sheet prior to folding, leaving windows 90, 92 in side walls 68, 70.

Referring to FIG. 2, the diameter of aperture 72 in front wall 66 is preferably greater than the thread diameter of fastener 28 but less than the diameter of head 84 of the threaded fastener. The threaded portion of fastener 28 will therefore most desirably pass through aperture 72 without threaded engagement before engaging aperture 62 of expander 22. Prior to inserting fastener 28 through aperture 72, it is preferably inserted through eye 94 of hook 26. As shown in FIGS. 1, 2 and 11–13, and as previously discussed, hook 26 is preferably a commercially available hook in which the shaped metal has a substantially circular cross-section, although it will be appreciated that hooks and clips having different shapes and cross-sections can be similarly used as part of support device 20 of the invention.

FIG. 12 depicts support device 20 of the invention as it would be installed into a relatively shallow mortar groove. Referring to FIG. 12, expander 22, retainer 24 and hook 26 are preassembled as shown in solid outline, with threaded fastener 28 extending through and threadedly engaging the aperture (not visible) in front wall 30 of expander 22. As preassembled, inflection lines 74, 76 of retainer 24 are not yet contacting expander 22. Side walls 32, 34 are inserted into space 96, which is defined on three sides by mortar layer 98, and opposed, spaced-apart brick surfaces 100, 102. Expander 22 is inserted into space 96, compressing side walls 32, 34 together slightly if necessary, depending upon whether or not the thickness of mortar layer 98 causes the spacing between brick surfaces 100, 102 to be slightly less than the spread of lower edges 46, 48 of expander 22. When lower edges 46, 48 first contact mortar layer 98, teeth 82 along lower edges 78, 80 of side walls 68, 70 are not yet in contact with brick surfaces 100, 102 and wings 86, 88 are not in contact with forwardly facing brick surfaces 104, 106, respectively. Once support device 20 is has been initially positioned inside space 96, however, threaded fastener 28 is desirably tightened and, as shown in dashed outline in FIG. 12, fastener 28 causes retainer 24 to be drawn closer to expander 22, and expander 22 causes teeth 82 of side walls 68, 70 of retainer 24 to be forced outwardly into contact with brick surfaces 100, 102, thereby anchoring support device 20 inside space 96. Where space 96 is relatively shallow, as in FIG. 12, wings 86, 88 do not contact brick surfaces 104, 106 even though support device 20 is fully engaged and ready to support a load as shown in FIG. 11.

It will be appreciated that height H of expander 22 (as shown in FIG. 3) and the length of threaded fastener 28 should be cooperatively selected to insure clearance so that threaded end 64 of fastener 28 does not contact mortar layer 98 before teeth 82 of retainer 24 fully engage brick surfaces 100, 102. Because the aperture in retainer 24 is larger than the aperture in expander 22, threaded fastener 28 does not threadedly engage retainer 24 as fastener 28 is threaded into expander 22. As front wall 66 of retainer 24 is forced closer to front wall 30 of expander 22 by head 84 of fastener 28, teeth 82 of retainer 24 are forced outwardly into contact with the bricks.

FIG. 13 depicts another installation of support device 20 wherein the space 108 in front of mortar layer 110 is deeper relative to front surfaces 112, 114 of bricks 116, 118, respectively. In this situation, wings 86, 88 of retainer 24 limit the extent to which retainer 24 can be drawn into space 108, and as fastener 28 is tightened relative to expander 22, expander 22 is drawn toward retainer 24, again causing side walls 68, 70 of retainer 24 to be spread outwardly so that teeth 82 engage the opposed, spaced-apart brick surfaces 120, 122.

Other alterations and modifications of the invention will likewise become apparent to those of ordinary skill in the art upon reading the present disclosure, and it is intended that the scope of the invention disclosed herein be limited only by the broadest interpretation of the appended claims to which the inventors are legally entitled.

What is claimed is:

1. A support device attachable to a brick wall, the device comprising expander, retainer, hook and fastener elements, the expander further comprising an elongated body with a front wall having oppositely disposed, elongated edges; an aperture in the front wall, said aperture having a diameter; first and second side walls connected to the front wall along the oppositely disposed, elongated edges; the first and second side walls each being inclined outwardly away from the front wall and each other; the first and second side walls each terminating in free edges, the free edges being insertable into a mortar groove between adjacent bricks of said wall;

the retainer being substantially parallel to the expander and further comprising an elongated body with a front wall having oppositely disposed, elongated edges; an aperture in the front wall, said aperture having a diameter; first and second side walls connected to the front wall along the oppositely disposed, elongated edges; the first and second side walls each terminating in free edges having a plurality of teeth; the first and second side walls each having a first section adjacent the front wall that is inclined away from the front wall and inwardly toward the opposite side wall, the first section of each side wall terminating at an inflection line, the inflection lines of the first and second side walls being spaced apart and substantially parallel; and each side wall having a second section inclined outwardly from its respective inflection line, the second section terminating at the free edge of each side wall;

an elongated fastener having a head and threaded section; and a hook member having an aperture;

the threaded section of the fastener being sequentially insertable through the apertures of the hook member and retainer, and threadedly engageable with the aperture of the expander to secure the hook member and the retainer to the expander.

2. The support device of claim 1 wherein the retainer further comprises first and second wings extending transversely from a portion of said elongated first and second edges of said retainer, said wings being substantially coplanar with said front wall of said retainer.

3. The support device of claim 1 wherein the expander, retainer, hook and screw are made of metal.

4. The support device of claim 1 wherein at least one of the expander, retainer, hook and screw is made of a polymeric material.

5. The support device of claim 1 wherein the diameter of the aperture of the retainer is greater than the diameter of the aperture of the expander.

6. The support device of claim 1 wherein the distance between the inflection lines is less than the distance between the elongated edges of the front wall of the expander, and the side walls of the retainer contact the side walls of the expander as the fastener is threaded into the aperture of the expander.

7. The support device of claim 1 wherein the outwardly inclined side walls of the expander cause each side wall of the retainer to expand outwardly as the fastener is threaded further into the aperture of the expander.

* * * * *

UNITED STATES PATENT AND TRADEMARK OFFICE
CERTIFICATE OF CORRECTION

PATENT NO. : 6,273,380 B1
DATED : August 14, 2001
INVENTOR(S) : Stephen L. Fillipp et al.

It is certified that error appears in the above-identified patent and that said Letters Patent is hereby corrected as shown below:

<u>Title page,</u>
References Cited, replace "D. 361,950" with -- D. 361,930 --.

Signed and Sealed this

Sixteenth Day of April, 2002

Attest:

JAMES E. ROGAN
*Attesting Officer*     *Director of the United States Patent and Trademark Office*